United States Patent [19]
Westwood

[11] Patent Number: 6,072,672
[45] Date of Patent: Jun. 6, 2000

[54] WRITE HEAD WITH NOTCHED P1 AND MINIMUM OVERMILLED P1 AND P2

[75] Inventor: John David Westwood, San Jose, Calif.

[73] Assignee: International Business Machines Corporation, Armonk, N.Y.

[21] Appl. No.: 09/281,249

[22] Filed: Mar. 30, 1999

Related U.S. Application Data

[62] Division of application No. 08/852,083, May 6, 1997, Pat. No. 5,916,423.

[51] Int. Cl.[7] ........................................................ G11B 1/00
[52] U.S. Cl. ........................... 360/126; 360/122; 360/113
[58] Field of Search ..................................... 360/113, 122, 360/125, 126

[56] References Cited

U.S. PATENT DOCUMENTS

| | | | |
|---|---|---|---|
| 4,436,593 | 3/1984 | Osborne et al. | 204/15 |
| 4,652,954 | 3/1987 | Church | 29/803 |
| 4,970,616 | 11/1990 | Ramaswamy | 360/122 |
| 4,992,901 | 2/1991 | Keel et al. | 360/110 |
| 5,141,623 | 8/1992 | Cohen et al. | 205/122 |
| 5,336,586 | 8/1994 | Togawa et al. | 430/316 |
| 5,349,745 | 9/1994 | Kawabe et al. | 29/603.18 |
| 5,353,182 | 10/1994 | Nakamura et al. | 360/104 |
| 5,393,376 | 2/1995 | Chen et al. | 216/22 |
| 5,406,434 | 4/1995 | Amin et al. | 360/126 |
| 5,438,747 | 8/1995 | Krounbi et al. | 29/603 |
| 5,452,164 | 9/1995 | Cole et al. | 360/113 |
| 5,462,637 | 10/1995 | Thiele | 216/22 |
| 5,479,696 | 1/1996 | McNeil | 29/603.2 |
| 5,484,075 | 1/1996 | Kimura et al. | 216/27 |
| 5,527,663 | 6/1996 | Togawa et al. | 216/22 |
| 5,554,303 | 9/1996 | Kaneko et al. | 216/22 |
| 5,578,342 | 11/1996 | Tran et al. | 427/131 |
| 5,649,351 | 7/1997 | Cole et al. | 29/603.14 |
| 5,726,841 | 3/1998 | Tong et al. | 360/122 |
| 5,734,533 | 3/1998 | Nepela | 360/119 |
| 5,804,085 | 9/1998 | Wu et al. | 216/22 |
| 5,809,637 | 9/1998 | Rottmayer | 29/603.15 |
| 5,843,521 | 12/1998 | Ju et al. . | |
| 5,875,542 | 3/1999 | Tran et al. | 29/603.14 |

FOREIGN PATENT DOCUMENTS

63-055711   5/1986   Japan .

*Primary Examiner*—William Klimowicz
*Attorney, Agent, or Firm*—Gray Cary Ware & Freidenrich LLP; Ervin F. Johnston

[57] ABSTRACT

A magnetic head is provided which has first and second notches in a first pole piece layer adjacent first and second corners at the base of a gap layer wherein the gap layer does not undercut a base of a second pole tip. Field regions of the first pole piece layer which extend from the first and second notches slope upwardly from the notches for protecting components below the first pole piece layer. In one aspect of the invention a method of defining the gap layer sputter deposition and ion milling steps are employed to form a protective layer on first and second side walls of the second pole tip so that unwanted portions of the gap layer can be removed without undercutting the gap layer below the base of the second pole tip. In another aspect of the invention a method of making the first and second notches by sputter deposition and etching are employed to define a protective layer with first and second openings where the first and second notches are to be formed following by ion milling which mills through the openings through the notches until the protective layer is consumed.

8 Claims, 10 Drawing Sheets

WRITE HEAD WITH NOTCHED P1 AND MINIMUM OVERMILLED P1 AND P2

CROSS REFERENCE TO RELATED APPLICATION

This application is a divisional application of application Ser. No. 08/852,083 filed May 6, 1997, now U.S. Pat. No. 5,916,423.

BACKGROUND OF THE INVENTION

1. Field of the Invention

The present invention relates to a write head with a first pole piece notched at its pole tip and first and second pole pieces which are substantially protected from milling during a process of making the notch.

2. Description of the Related Art

A write head comprises first and second pole pieces that have first and second pole tips terminating at an air bearing surface and ends recessed from the ABS that are connected at a back gap. An insulation stack, which comprises a plurality of insulation layers, is sandwiched between the first and second pole pieces and a coil layer is embedded in the insulation stack. A processing circuit is connected to the coil layer for conducting current (write signals) through the coil layer which, in turn, generates corresponding magnetic fields on the first and second pole pieces. A non-magnetic insulative gap layer is sandwiched between the first and second pole tips so that the magnetic fields fringe across the first and second pole tips at the ABS. In a magnetic disk drive, a magnetic disk is rotated adjacent to and a short distance from the ABS so that fringing of the magnetic fields magnetizes the disk along circular tracks. The written circular tracks then contain information in the form of magnetized regions that can be detected by a read head.

A write head and read head are typically combined to form a merged magnetoresistive (MR) head. The read head includes an MR sensor which is sandwiched between first and second insulative gap layers that are, in turn, sandwiched between first and second shield layers. In a merged MR head, the second shield and the first pole are a common layer. The MR sensor detects magnetic fields from the circular tracks of the rotating disk when its resistance changes in response to the strength and polarity of the fields. A sense current is conducted through the MR sensor, which results in voltage changes that are received by the processing circuitry as readback signals.

The second pole tip trails the first pole tip with respect to the rotating disk and is therefore the last of the two pole tips to impress information field signals on the circular tracks. The second pole tip is bounded by a base, which sits directly on the gap layer, a top, and first and second side walls. The first and second side walls intersect the base at first and second corners, the importance of which will be described hereinafter. There is a strong-felt need to provide the second pole tip with a narrow track width—the lateral distance between the first and second side walls at the base. A narrow track width increases the number of tracks that can be recorded per inch (TPI) on the magnetic disk. Narrow track width thus implies a smaller magnetic disk drive for a given number of recorded bits.

It is important that the side walls of the second pole tip, especially at the base, be well formed in a linear configuration so that fringing of the magnetic fields from the pole tips is confined substantially to the track width of the second pole tip. If the magnetic fields fringe from irregular side walls of the second pole tip to the first pole tip laterally beyond the track width of the second pole tip, overwriting of the circular tracks may result which will reduce the track density of the magnetic disk. Ideally, the second pole tip should write well-defined narrow tracks which, in turn, are read by a read head that reads slightly more narrowly than the written track. This obviates the need for guard bands between tracks.

The second pole, along with its second pole tip, is frame-plated on top of the gap layer. After depositing a seedlayer on the gap layer, a photoresist layer is spun on the seedlayer, imaged with light, and developed to provide an opening surrounded by a resist wall for plating the second pole piece and second pole tip. To produce a second pole tip with a narrow track width, the photoresist layer has to be correspondingly thin. This relationship is referred to as the "aspect ratio", which is the ratio of the thickness of the photoresist in the pole tip region to the track width of the second pole tip. Preferably, the aspect ratio should be on the order of three. In other words, for a track width of 1 µm, the thickness of the photoresist in the pole tip region should be about 3 µm. If the photoresist is thicker than this, the side walls of the second pole tip, especially at the base, will not be well formed due to scattering of light as it penetrates the photoresist during the imaging step.

Once the second pole tip is well formed, it is desirable to notch the first pole tip opposite the first and second corners at the base of the second pole tip. Here, the gap layer is bounded by a base that rests on the first pole piece, a top that engages the base of the second pole tip, and first and second side walls that intersect the first and second side walls at first and second corners, respectively. Notching of the first pole piece occurs immediately adjacent each of the first and second corners of the gap layer. Notching provides the first pole piece with a track width that substantially matches the track width of the second pole piece.

A prior art process for notching in the first pole piece entails ion beam milling the gap layer and the first pole piece, employing the second pole tip as a mask. The gap layer is typically alumina and the first and second pole pieces and pole tips are typically Permalloy (NiFe). The alumina mills more slowly than the Permalloy; thus the top of second pole tip and a top surface of the first pole piece are milled more quickly than the gap layer. Further, during ion milling, there is much redeposition (redep) of alumina on surfaces of the workpiece. In order to minimize redep, the milling ion beam is typically directed at an angle to a normal through the layers, which performs milling and cleanup simultaneously. The gap layer in the field remote from the first and second corners of the second pole piece is the first to be milled because of a shadowing effect at the first and second corners when the ion beam is angled. In this case, the ion stream will overmill the first pole piece before the gap layer is removed adjacent the first and second corners of the second pole tip in the region where the notching is to take place. After the gap layer is removed above the sites where the notching is to take place, ion milling continues in order to notch the first pole piece at the sites adjacent the first and second corners of the gap layer. Again, within angled ion beams overmilling of the first pole piece takes place in the field beyond the progressively formed notches, thereby forming surfaces of the first pole piece that slope downwardly from the first and second corners of the gap layer. As is known, such overmilling of the first pole piece can easily expose leads to the MR sensor and the second gap layer of the read head rendering the head inoperative.

Even if overmilling of the first pole piece can be controlled, there is potentially a more troublesome problem, namely overmilling the top of the second pole tip when the unwanted portions of the gap layer are milled and notches are formed. In order to compensate for this overmilling, the aspect ratio is increased so that a top portion of the top of the second pole tip can be sacrificed during the milling steps. As already stated, when the aspect ratio is increased, definition of the second pole tip is degraded, resulting in track overwriting.

In order to minimize overmilling of the first pole piece, another process removes the gap layer, except for a desired portion between the first and second pole tips, by a wet etchant. After the unwanted portions of the gap layer are removed, the first pole piece is ion milled, employing the second pole tip as a mask. The only overmilling of the first pole piece is due to the ion milling of the notches at the first and second corners of the gap layer. This process also eliminates significant redep of the alumina. A problem with this process, however, is that the etching undercuts the gap layer under the base of the second pole tip which is a critical area for the transfer of field signals. The undercut regions provide spaces which can be filled with Permalloy redeposited during subsequent ion milling of the first pole piece or redep of other foreign material upon subsequent milling and clean up steps.

Still another process proposes plating the top and first and second side walls of the second pole tip with a protective metal layer before etching the unwanted portions of the gap layer. When the etching reaches the inside thickness of each protective metal layer, the process is stopped so that the gap layer is not undercut under the base of the second pole tip. It is proposed that the protective metal layer remain in the head because of the difficulty of removing it. Disadvantages of this process are the difficulty of the plating step and the potential of the protective metal layer interfering with the magnetics of the second pole tip.

SUMMARY OF THE INVENTION

The present invention employs sputtered protective layers to: (1) prevent undercutting the gap layer under the base of the second pole tip upon wet etching unwanted portions of the gap layer and/or (2) minimize overmilling of the first and second pole pieces upon notching the first pole piece by ion beam milling. The result is a uniquely shaped first pole piece. Instead of the top surfaces of the first pole piece sloping downwardly from the first and second corners of the gap layer, the top surfaces of the first pole piece have no significant slope or else slope upwardly from well formed first and second notches adjacent the first and second corners of the gap layer. Accordingly, the thickness of the first pole piece in the field is well preserved to protect sensitive components therebelow.

To prevent undercutting of the gap layer under the base of the second pole tip I sputter deposit a material on the top and first and second side walls of the second pole tip. I then ion beam mill at an angle to a normal to the layers which results in removal of the material from the flat regions of the write head structure and redep a portion of this material on the first and second side walls of the second pole tip. This provides first and second walls of protective material on the first and second side walls of the second pole tip which extend from the top to the base of the second pole tip. I then etch the gap layer with an etchant until the etchant reaches the first and second corners at the base of the second pole tip. The etch is then stopped and the protective material is removed with a second etchant. It is important that the first etchant not etch the first and second pole pieces and their pole tips nor the protective material layer. It is also important that the second etchant not etch the first and second pole pieces, their pole tips and the gap layer. The first etchant etches only the gap layer and the second etchant etches only the protective material layer. This process of removing the unwanted gap layer portions prevents overmilling of the top of the second pole tip and the field regions of the first pole piece.

After the gap layer is defined I sputter deposit a protective material on the top and first and second side walls of the second pole tip as well as on the top of the first pole piece extending from the first and second corners of the second pole tip and the gap layer. This forms a continuous layer of protective material on these components. I then etch this continuous layer which results in the removal of the protective layer from the first and second side walls leaving protective layer portions on the top of the second pole tip and on top of the first pole piece except for first and second openings immediately adjacent the first and second corners of the gap layer. I then ion mill at an angle to the normal to the layers which mills first and second notches in the first pole piece adjacent the first and second openings. I continue this milling until the protective layer portions on the top of the second pole piece and on top of the first pole piece are consumed. This prevents overmilling of the top of the second pole tip and provides the top of the first pole tip with first and second upwardly sloping surfaces away from the first and second notches which is just the opposite of what occurs in the prior art. Accordingly, the aspect ratio does not have to be increased and sensitive components under the first pole piece are not potentially exposed. If desired, ion milling can continue after removal of the protective layer portions to planarize the first pole piece and deepen the notches. This will be done at the expense of overmilling the top of the second pole piece which will have to be kept within limits to prevent a problem with the aspect ratio. If the write gap is very thin, in the order of 0.2 $\mu$m or less, I have provided an optional method of notching the first pole piece which includes the aforementioned steps except the write gap is not defined by etching prior to commencing the forming process. Instead the previous process for notching the first pole piece is employed for defining the write gap layer as well as notching the first pole piece.

An object of the present invention is to provide a write head with minimum overmilled second pole tip and notched first pole piece.

Another object is to provide a write head wherein the thickness of field regions of the first pole piece extending from first and second notches increases so as to provide protection for components under the first pole piece.

A further object is to provide a method of defining a gap layer between the base of a second pole tip and the first pole piece by forming first and second protective layers on first and second side walls of the second pole tip, the formation of these layers being accomplished by sputter deposition followed by ion beam milling.

Still another object is to provide a method of notching a first pole piece adjacent first and second corners of the gap layer without overmilling the top of the second pole tip or the top of the first pole piece in field regions extending from the notching.

Still a further object is to accomplish the previous method by forming a protective layer with openings adjacent where notching is to be performed followed by ion beam milling which mills the notches until the protective layer has been consumed.

Other objects and attendant advantages of the invention will be appreciated upon reading the following description taken together with the drawings.

DESCRIPTION OF THE PREFERRED EMBODIMENT

Figure 1:
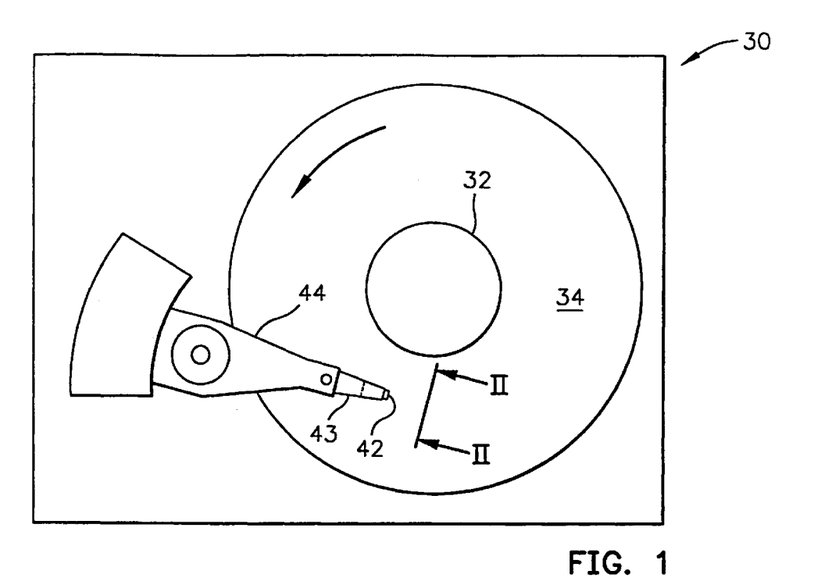
FIG. 1 is a planar view of an exemplary magnetic disk drive.
Figure 2:
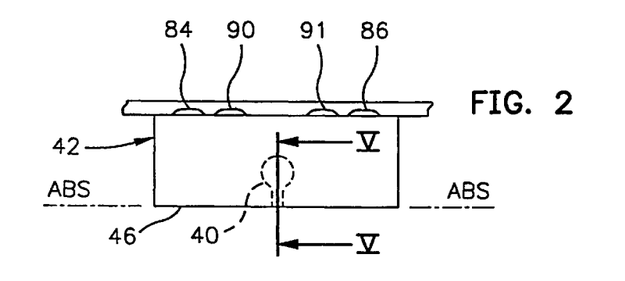
FIG. 2 is an end view of a slider with a magnetic head of the disk drive as seen in plane II—II.
Figure 3:
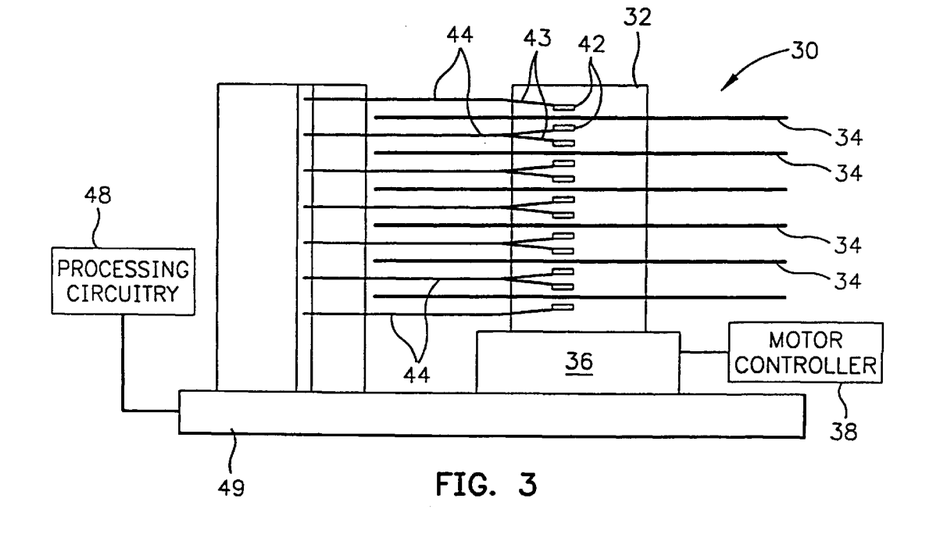
FIG. 3 is an elevation view of the magnetic disk drive wherein multiple disks and magnetic heads are employed.
Figure 4:
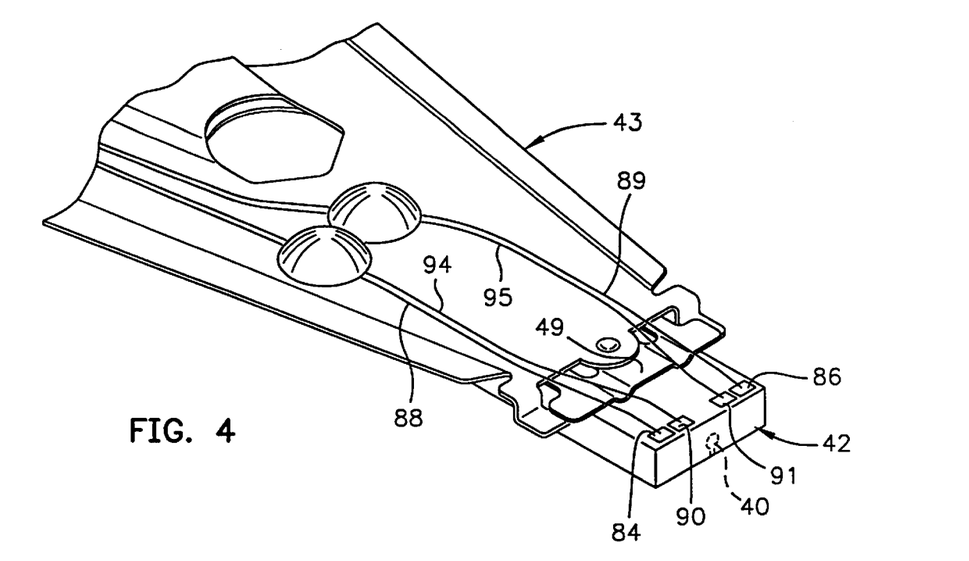
FIG. 4 is an isometric illustration of an exemplary suspension system for supporting the slider and magnetic head.

Referring now to the drawings wherein like reference numerals designate like or similar parts throughout the several views there is illustrated in FIGS. 1–3 a magnetic disk drive 30. The drive 30 includes a spindle 32 which supports and rotates a magnetic disk 34. The spindle 32 is rotated by a motor 36 which in turn is controlled by a motor controller 38. A merged magnetoresistive (MR) head 40 for reading and recording is mounted on a slider 42 which, in turn, is supported by a suspension 43 and actuator arm 44. A plurality of disks, sliders and suspensions may be employed in a large capacity direct access storage device (DASD) as shown in FIG. 3. The suspension 43 and actuator arm 44 position the slider 42 to place the magnetic head 40 in a transducing relationship with a surface of the magnetic disk 34. When the disk 34 is rotated by the motor 36 the slider is supported on a thin (typically, 0.05 $\mu$m) cushion of air (air bearing) by the air bearing surface (ABS) 46. The magnetic head 40 may then be employed for writing information to multiple circular tracks on the surface of the disk 44, as well as for reading information therefrom. Processing circuitry 48 exchanges signals representing such information with the head 40, provides motor drive signals, and also provides control signals for moving the slider to various tracks. In FIG. 4 the slider 42 is shown mounted to a head gimbal assembly (HGA) 49 which in turn is mounted to the suspension 43.

Figure 5:
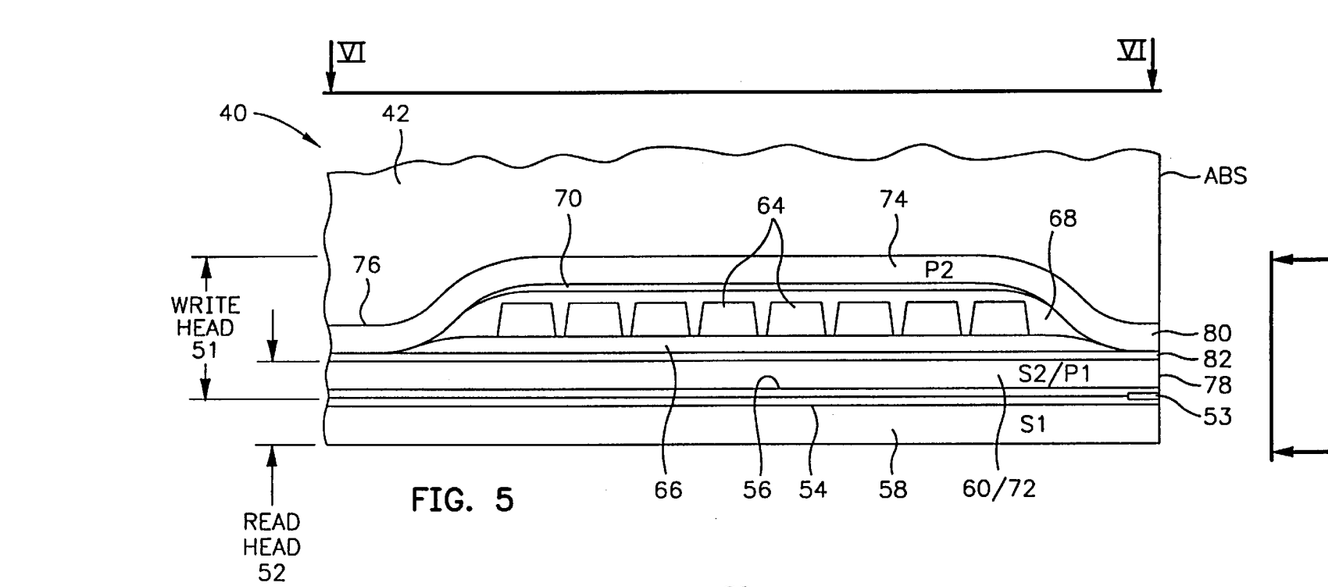
FIG. 5 is a partial vertical cross sectional view of the slider and magnetic head as seen in plane V—V of FIG. 2.

FIG. 5 is a side cross-sectional elevation view of the head 40, which is preferably a merged magnetoresistive (MR) or spin valve head, having a write head portion 51 and a read head portion 52, the read head portion employing an MR or spin valve sensor 53 of the present invention. The MR or spin valve sensor 53 is sandwiched between first and second gap layers 54 and 56 and the gap layers are sandwiched between first and second shield layers 58 and 60. In response to external magnetic fields, the resistance of the MR or spin valve sensor 53 changes. A sense current conducted through the sensor causes these resistance changes to be manifested as potential changes. These potential changes are then processed by the processing circuitry 48 shown in FIG. 3.

Figure 6:
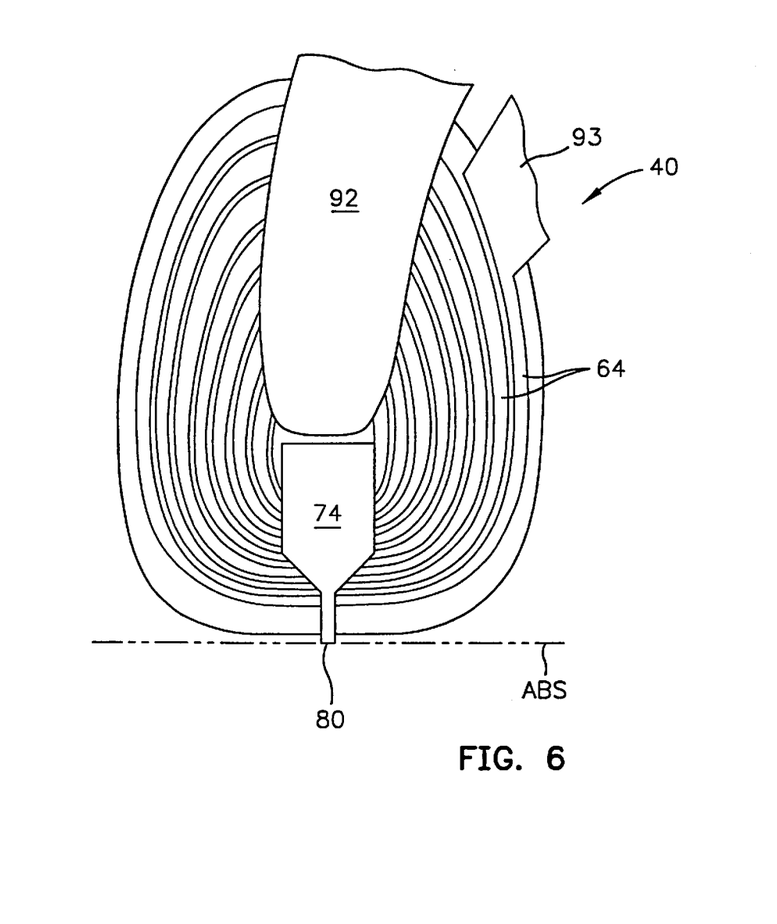
FIG. 6 is a plan view taken along plane VI—VI of FIG. 5 with all material above the second pole piece removed and a remainder of the coil back of the back gap additionally shown.
Figure 7:
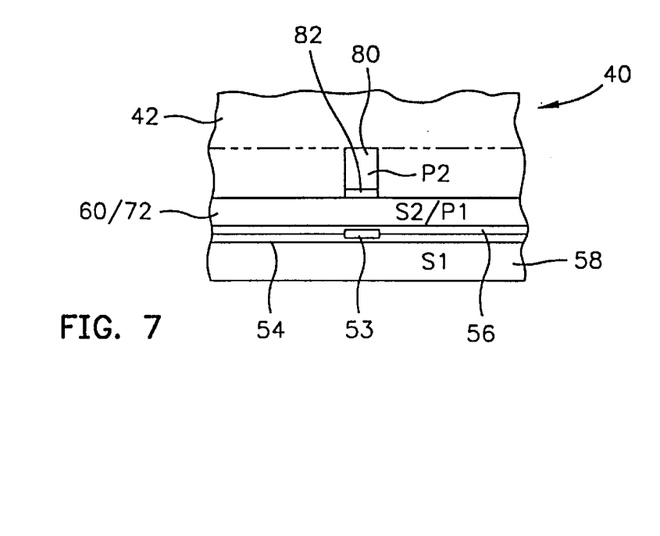
FIG. 7 is a partial ABS view of the slider taken along plane VII—VII of FIG. 5 to show the read and write elements of the magnetic head.

The write head portion of the prior art head includes a coil layer 64 which is sandwiched between first and second insulation layers 66 and 68. A third insulation layer 70 may be employed for planarizing the head to eliminate ripples in the second insulation layer caused by the coil layer 64. The first, second and third insulation layers are referred to in the art as an "insulation stack". The coil layer 64, and the first, second and third insulation layers 66, 68 and 70 are sandwiched between first and second pole piece layers 72 and 74. The first and second pole piece layers 72 and 74 are magnetically coupled at a back gap 76 and have first and second pole tips 78 and 80 which are separated by a gap layer 82 at the ABS. As shown in FIGS. 2 and 4 first and second solder connections 84 and 86 connect leads (not shown) from the MR sensor 53 to leads 88 and 89 on the suspension 43 and third and fourth solder connections 90 and 91 connect leads 92 and 93 from the coil 64 (see FIG. 6) to leads 94 and 95 on the suspension.

Figure 8:
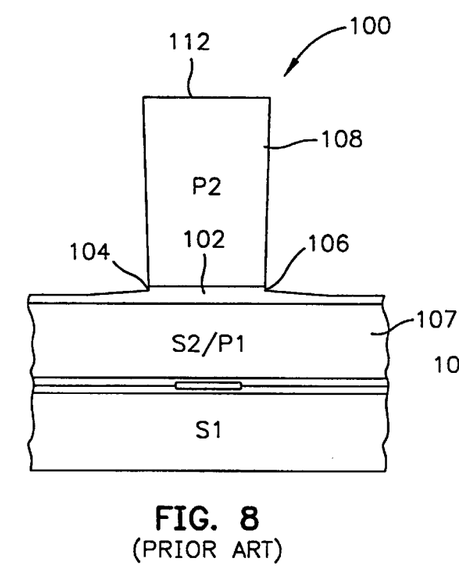
FIG. 8 is an ABS view of a prior art magnetic head after milling a P2 seedlayer.
Figure 9:
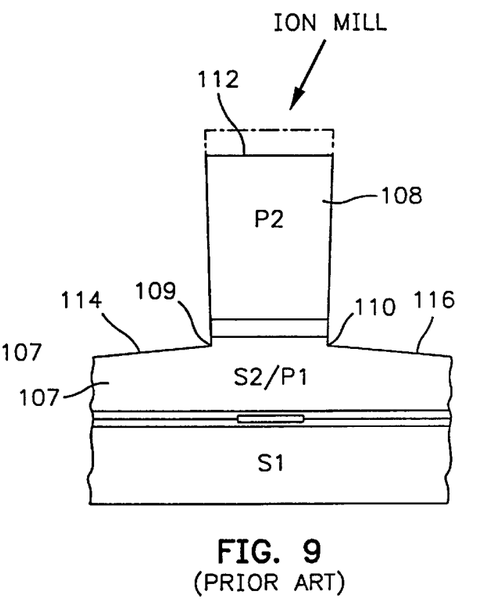
FIG. 9 is an ABS view of a magnetic head after employing a prior art process of milling a gap layer and a first pole piece to form notches therein.

FIG. 8 is an ABS view of a prior art merged magnetic head 100 after a P2 seedlayer (not shown) has been removed by ion milling. It can be seen that this ion milling has notched the gap layer 102 at 104 and 106. One method of notching the first pole piece layer 107 in the prior art is to ion mill through the gap layer into the first pole piece layer 107, as shown in FIG. 9. This notches the first pole piece layer at 109 and 110. Notching of the P1 layer 107 is desirable since it minimizes side writing between the second pole tip 108 and the first pole piece 107. Unfortunately, the process shown in FIG. 9 results in consumption of a top surface 112 of the second pole tip 108, as shown by the phantom lines in FIG. 9. Since ion milling is typically performed at an angle to a normal to the thin film layers, as shown in FIG. 9, the second pole tip 108 shadows the milling of the notching at 109 and 110 approximately 50% of the time while the workpiece is rotated. The first pole piece 107 is overmilled in locations 114 and 116 which extend in the field from the notches 109 and 110 respectively. This causes the first pole piece 107 to have downwardly sloping top surfaces 114 and 116, as shown in FIG. 9, which undesirably reduces the thickness of the first pole piece 107 in the field. This can potentially expose sensitive elements beneath the first pole piece 107 which would render the head inoperative.

Figures 10, 11:
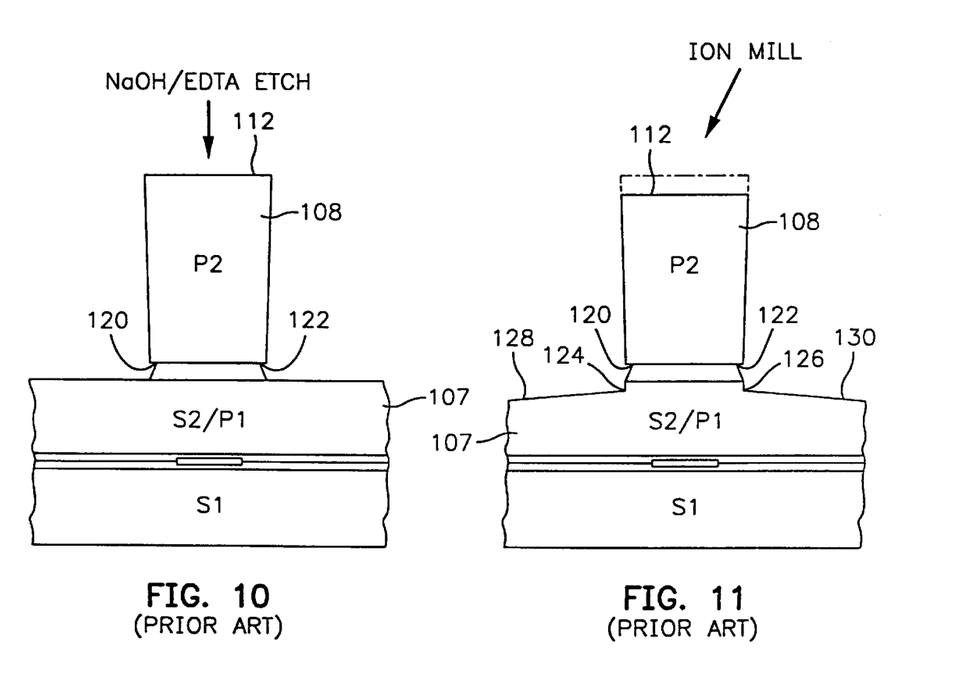
FIG. 10 is an ABS view of a magnetic head after employing a prior art process of forming a gap layer between a base of a second pole tip and a first pole piece.
FIG. 11 is an ABS view of a magnetic head employing a prior art process of notching a first pole piece after forming the gap layer shown in FIG. 10.

The gap layer 102 mills more slowly than the Permalloy (NiFe) of the first and second pole pieces 107 and 108 which results in more rapid ion milling of the top 112 of the second pole tip 108 and the fields 114 and 116 of the first pole piece than the gap layer 102. A prior art process to eliminate milling of the top 112 of the second pole piece and the fields 114 and 116 of the first pole piece during definition of the gap layer 102 is shown in FIG. 10. In this process the gap layer 102 is defined by an etch such as NaOH/EDTA wherein EDTA is (etylinedinitrilo)tetraacetic acid, disodium salt, dyhydrate. Unfortunately, this process etches the gap layer laterally as fast as it etches the gap layer downwardly. The result is that the gap layer is undercut at 120 and 122 with respect to the second pole tip 108. This is followed by a prior art process, shown in FIG. 11, wherein ion milling is employed for notching the first pole piece layer at 124 and 126. The top 112 of the second pole tip layer is not consumed as much as shown by the prior art process in FIG. 9 and the field regions 128 and 130 of the first pole piece are not sloped downwardly as much. Unfortunately, this process provides cavities at the undercuts 120 and 122 which lodges materials subsequently ion milled, such as Permalloy which can short circuit the first and second pole tips. Accordingly, there is a strong-felt need to provide a write head with a well-defined gap layer and notching of the first pole piece with minimum overmilling of the top of the second pole tip 108 and field regions 114 and 116 or 128 and 130 of the first pole piece 107 and methods of making such a write head.

Figure 12:
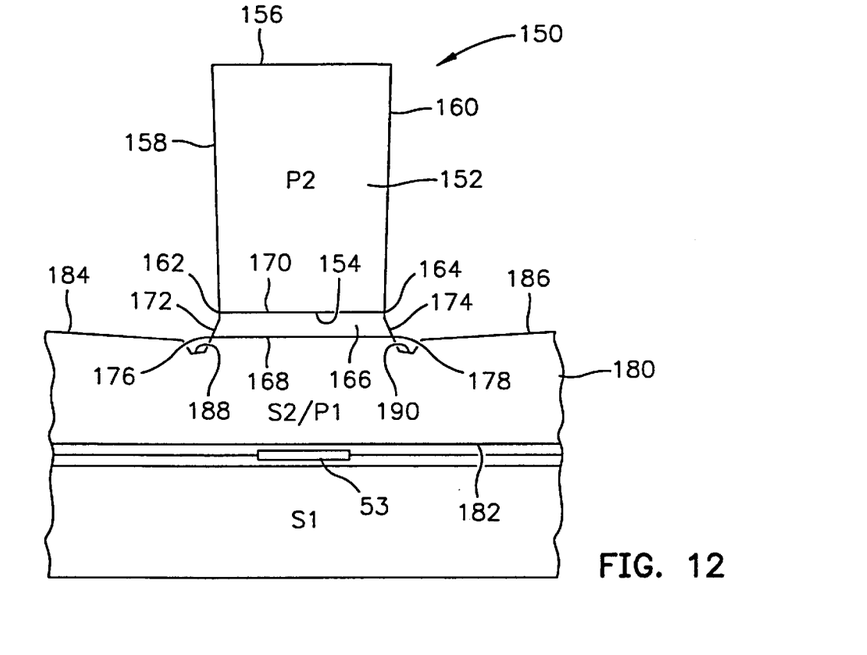
FIG. 12 is an ABS view of a magnetic head, according to the present invention, employing a notched first pole piece (P1) and upwardly sloping top surfaces of the first pole piece which extend from the notches.

FIG. 12 shows a merged MR head with the improved write head portion 150 of the present invention. The write head 150 includes a second pole tip 152 which is bounded in the ABS view by a base 154, a top 156 and first and second side walls 158 and 160 which provide the second pole tip 152 with the shape of a pedestal as seen in the ABS view. The second pole tip 152 has first and second corners 162 and 164 which are intersections of the first and second side walls 158 and 160 with the base 154. In a similar fashion the gap layer 166 is bounded by a base 168, a top 170 and first and second side walls 172 and 174. The gap layer 166 has first and second corners 176 and 178 which are located at intersections of the first and second side walls 172 and 174 with the base 168. It can be seen that the side walls 158 and 160 of the second pole tip 152 slope slightly inwardly from the top 156 to the base 154. This is due to prior steps of constructing the second pole tip 152 by photolithography techniques. The top 170 of the gap layer has the same width in the ABS view as the base 154 of the second pole tip, thereby eliminating the aforementioned undercutting of the gap layer below the base 154 of the second pole tip, as shown in prior art write heads of FIG. 10 and FIG. 11. The first pole piece 180 has a bottom surface 182, which can be considered as defining a plane of orientation, and a top surface with comprises field regions 184 and 186. The top surface of the first pole piece is notched at 188 and 190 immediately adjacent the corners 176 and 178 of the gap layer 166.

Figure 13:
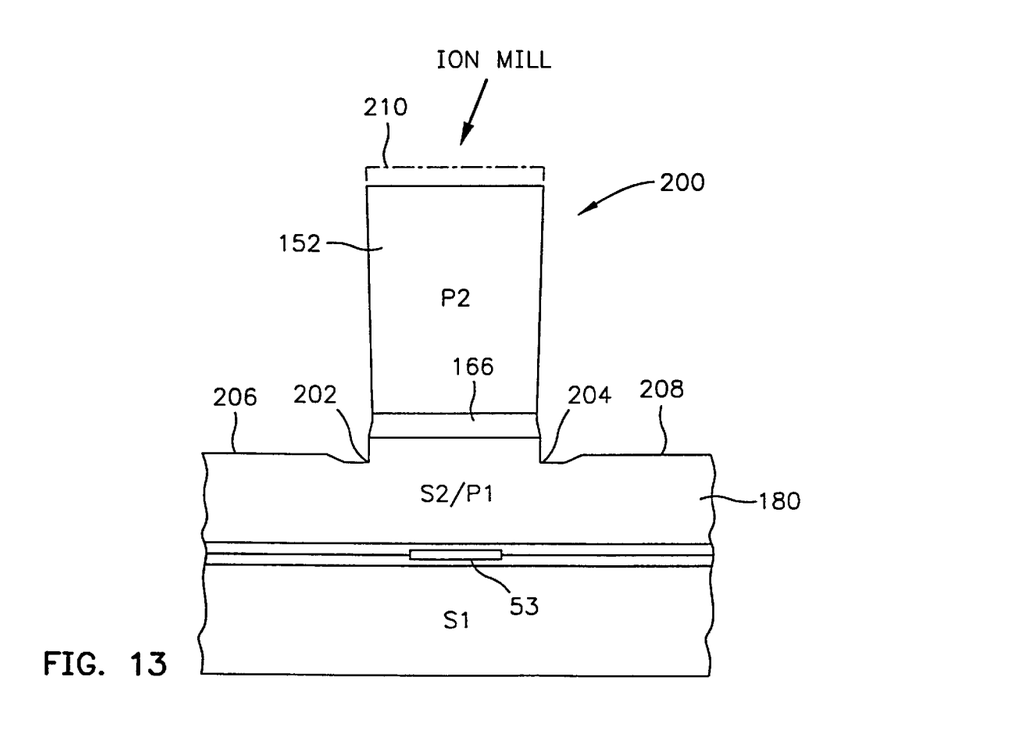
FIG. 13 is an ABS view of the magnetic head of FIG. 12 further processed to deepen the notches and planarize the first pole piece.
Figure 14:
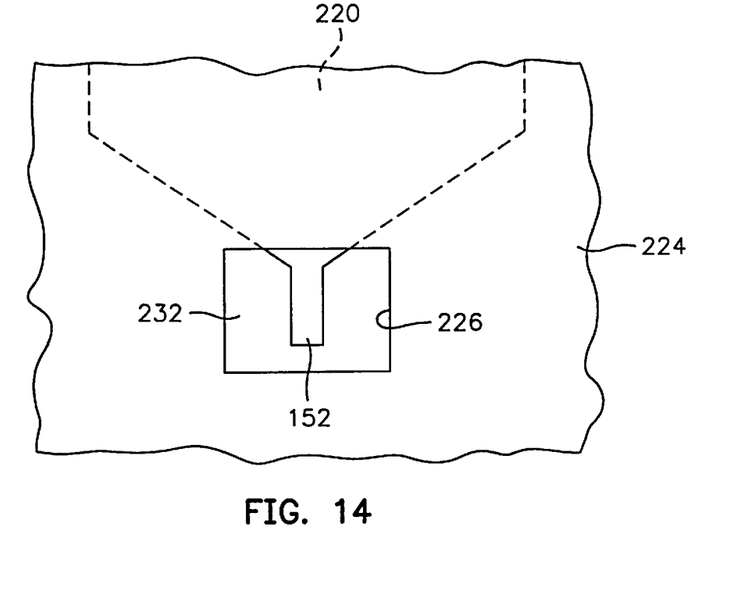
FIG. 14 is a plan view of mask which may be employed with an opening in a pole tip region for defining a gap layer and notching the first pole piece.

It should be noted that the field regions 184 and 186 of the first pole piece slope upwardly from the notches 188 and 190 which specifically distinguishes the present invention from prior art configurations. The upwardly sloping field regions 184 and 186 provide additional thickness for the first pole piece 180 away from the notches 188 and 190 so as to additionally protect sensitive components therebelow, such as leads (not shown) to the MR element 53. Methods to be described hereinafter construct the improved write head 150 of FIG. 12 with virtually no consumption of the top 156 of the second pole tip 152 and with minimal overmilling of the field regions 184 and 186 of the first pole piece 180. If desired, the write head 150 may be ion milled, as shown in FIG. 13, to produce another embodiment 200 of the write head. The write head 200 has notches 202 and 204 which have been further deepened and field regions 206 and 208 have been substantially planarized. The write head 200 is built at the expense of consuming a portion of the top 210 of the second pole tip 152 and reducing the thickness of the first pole piece 180 in the field regions 206 and 208. The advantage of the head 200 is that the notches 202 and 204 have been deepened which may be desirable for some applications. Since considerable overmilling has been prevented prior to the ion milling in FIG. 13, an acceptable head can be constructed provided measures are taken to ensure that overmilling of the top 210 of the second pole and the field regions 206 and 208 of the first pole piece are not excessive.

FIGS. 14–24 illustrate the steps employed in methods of constructing the magnetic heads shown in 12 and 13. FIG.

Figure 15:
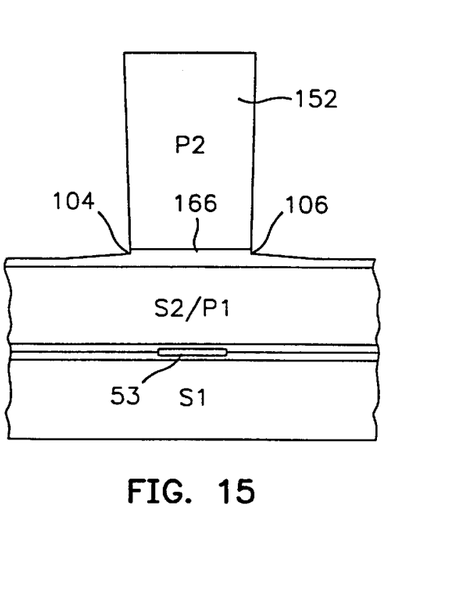
FIG. 15 is an ABS view of a magnetic head (same as FIG. 8) prior to commencing the present processes for defining the gap layer and notching the first pole piece.
Figure 16:
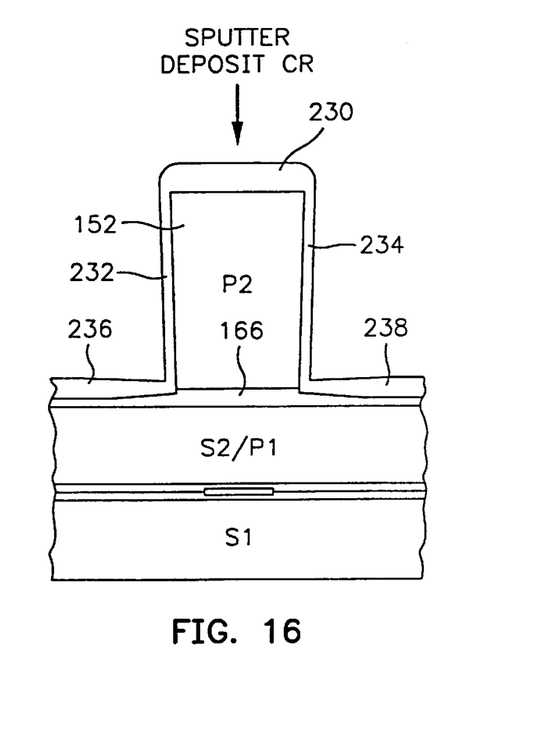
FIG. 16 is an ABS view of the magnetic head after sputter depositing a protective layer.
Figures 17, 18:
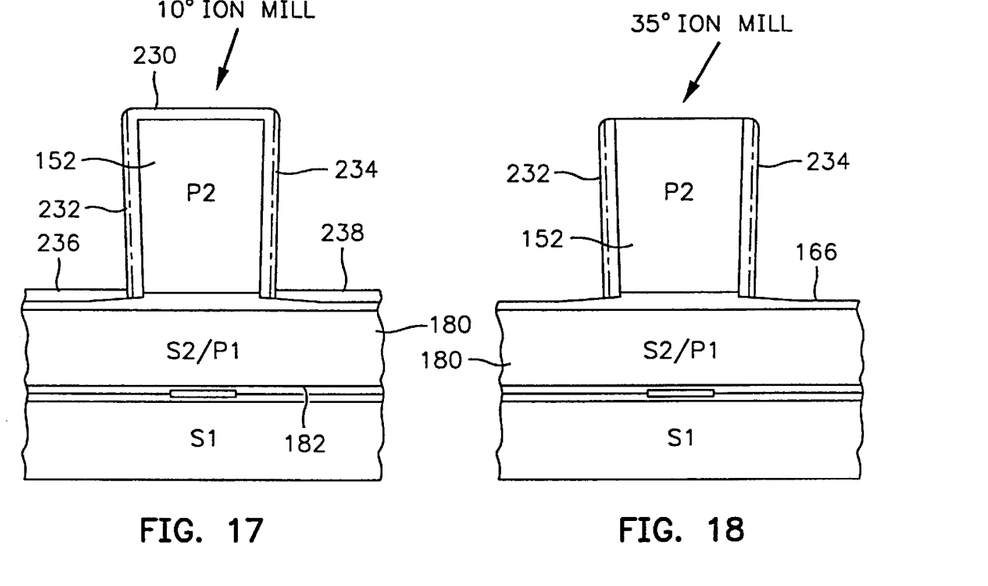
FIG. 17 is an ABS view of the magnetic head showing ion milling of a portion of the protective layer from the flat regions of the write head structure and redeposition a portion of this material on the side walls of the second pole tip.
FIG. 18 is an ABS view of the magnetic head showing additional ion milling of the protective layer from the flat regions of the write head structure and redeposition a portion of this material on the side walls of the second pole tip.

14 illustrates an optional masking of a major portion of a second pole piece 220 and surrounding regions by a mask 224, which may be photoresist, which has an opening 226 for exposing the second pole tip 152 and the gap layer 166 (see FIG. 15) for processing as described hereinbelow. FIG. 15 shows results of a prior art process after partial completion of the write head which is the same as that shown in FIG. 8. The gap layer 166 has notches 104 and 106, as described hereinabove, as a result of some overmilling to remove the second pole piece seedlayer (not shown). FIGS. 16–20 show a process for configuring the gap layer 166. FIGS. 21–24 show a process for constructing the notches 188 and 190 in the first pole piece layer 180.

In my experiments the second pole tip 152 had an original height of 3.4 μm and the gap layer 166 was 0.30 μm thick between the second pole tip and the first pole piece 180. After the step shown in FIG. 15, I deposited a protective layer of material, such as chromium, by sputter deposition on the top, first and second side walls of the second pole tip and first and second regions of the top of the first pole piece providing the protective layer with a top portion 230, first and second vertical portions 232 and 234 and substantially planar portions 236 and 238. The vertical portions 232 and 234 were thinner than the portions 230, 236 and 238, since sputter deposition builds up more rapidly on flat surfaces than vertical surfaces. This is because the plasma employed in the sputter deposition deposits from all directions within 180° on flat surfaces whereas the plasma deposits in all directions within only 90° on the vertical surfaces. This is due to the blocking effect of the second pole tip 152. The result was that the thickness of portions 230, 236 and 238 was 0.40 μm and the thickness of the vertical portions 232 and 234 was 0.20 μm.

Next, I ion milled at 10° to the plane of orientation 182. In ion milling at 10° approximately two-thirds or 0.28 μm was milled from the top portion 230 and portions 236 and 238 which resulted in a redeposition (redep) of 0.14 μm chromium on the side walls 232 and 234, as shown by the phantom lines in FIG. 17. Next, I ion milled at 35° to a normal to the plane 182 which completely removed the material portion 230 from the top of the second pole tip and the planar portions 236 and 238. A small portion of the chromium milled from these portions further increased the thickness of the vertical portions 232 and 234. If desired, ion milling may continue at 70° and 20° to a normal to the plane 182 to perform a desired cleanup of redeposited material. The final chromium thickness of the vertical portions 232 and 234 was 0.30 μm. There was a slight overmilling of the top of the second pole tip of approximately 0.20 μm and a portion of the gap 166 was removed in field regions beyond the second pole tip 152.

Figures 19, 20:
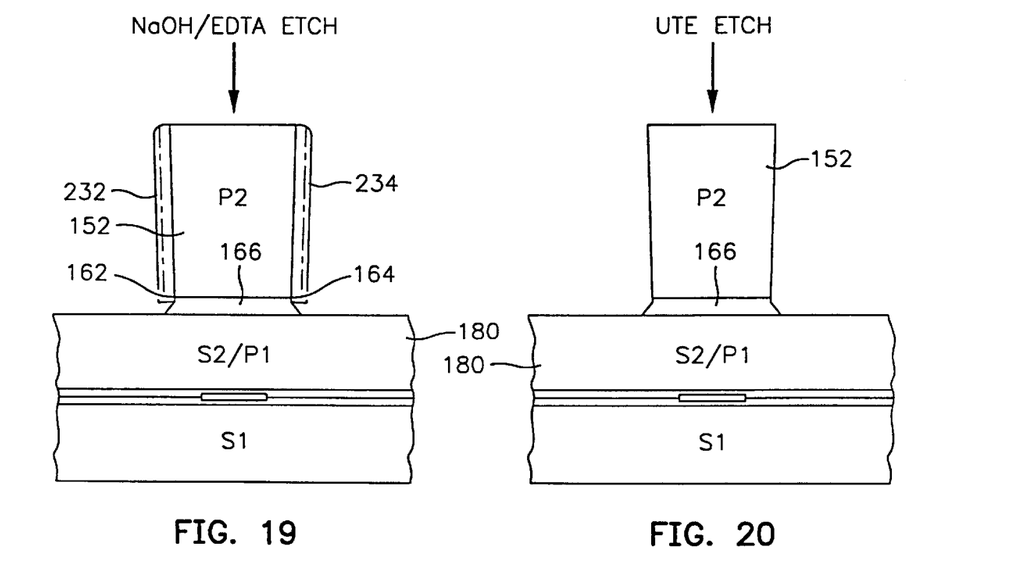
FIG. 19 is an ABS view of the magnetic head showing unwanted portions of the gap layer removed by etching.
FIG. 20 is an ABS view of the magnetic head showing removal of the protective layer by etching.

Next, I etched the work piece with a NaOH/EDTA etchant which etched only the gap layer 166. The NaOH had a ph of 11 and the EDTA was 4.7% by weight of the NaOH/EDTA combination. The gap layer was alumina $Al_2O_3$ and the first and second pole pieces along with their first and second pole tips were constructed of Permalloy (NiFe). The etchant did not attack the first and second pole pieces. The etch rate of alumina by the NaOH/EDTA etchant is approximately 750 Å per minute. Since the thickness of the vertical chromium layer portions 232 and 234 were 0.30 μm it took four minutes for the etchant to reach the corners 162 and 164 at the base of the second pole tip, as shown in FIG. 19. After four minutes, the etch was terminated and the vertical layer portions 232 and 234 were removed by a chromium etchant such as UTE as shown in FIG. 20. UTE can be obtained from Cyantek Corp. The UTE etchant attacks only the chromium and does not etch the first and second pole tips 180 and 152 nor the gap layer 166. Another suitable chromium etchant is 164.5 grams ceric ammonium nitrate, 43 ml concentrated (70%) perchloric acid along with sufficient water to make one liter. The gap layer 166, shown in FIG. 20, is well-formed since its top has a width which matches the width of the base of the second pole tip 152.

Figures 21, 22:
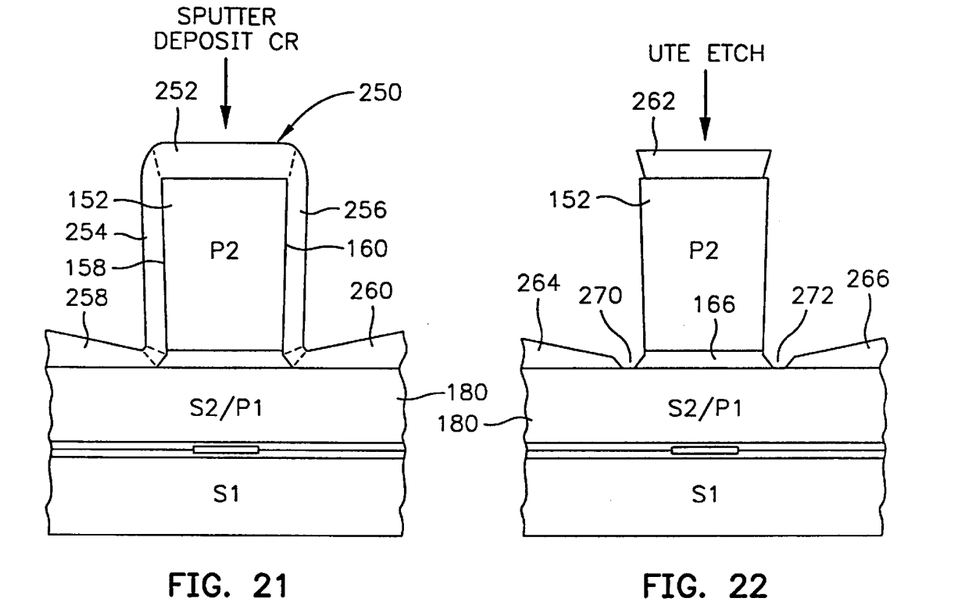
FIG. 21 is an ABS view of the magnetic head showing a first step of sputter deposition of a layer of protective material in a first embodiment of the invention for notching the first pole piece.
FIG. 22 is an ABS view of the magnetic head showing a second step of removal of portions of the protective layer by etching to expose the first pole piece through first and second openings where first and second notches are to be formed.

The method of constructing the notches is shown in FIGS. 21–24. I first deposited a layer of chromium 250 by sputter deposition, as shown in FIG. 21, which provides a top pole tip portion 252, vertical side portions 254 and 256 and sloping portions 258 and 260 on the top of the first pole piece 180. In my experiment the top chromium portion 252 was 1.10 μm thick and field portions (not shown) beyond the sloping portions 258 and 260 were also 1.10 μm thick. The vertical portions 254 and 256 were 0.55 μm thick. The portions 254 and 256 were thinner for the same reasons described hereinabove with regard to the process steps shown in FIG. 16. The portions 258 and 260 slope upwardly from the gap layer 166 because of the shadowing of the second pole tip 152 during sputter deposition. This shadowing decreases the further the distance laterally from the side walls 158 and 160 of the second pole tip 152 resulting in a full thickness deposit of 1.10 μm of chromium beyond the portions 258 and 260, as discussed hereinabove.

Next, I etched the workpiece with a UTE etchant, as described hereinabove, which etches away the vertical portions 254 and 256 resulting in remaining chromium portions 262, 264 and 266. It should be noted that the vertical portions of chromium 254 and 256 in FIG. 21 are less dense than the flat portion 252 and near flat portions 258 and 260. Accordingly, I found that the vertical portions 254 and 256 are etched approximately five times as fast as the flat portions 262, 264 and 266 leaving a desirable amount of these latter portions after removal of the vertical portions 254 and 256. The etching step in FIG. 22 provides the chromium layer, comprising portions 264 and 266, with desirable openings 270 and 272 which open up top portions of the first pole piece 180 for notching purposes as described hereinbelow. The thickness of the portion 262 in FIG. 22 was 0.75 μm.

Figures 23, 24:
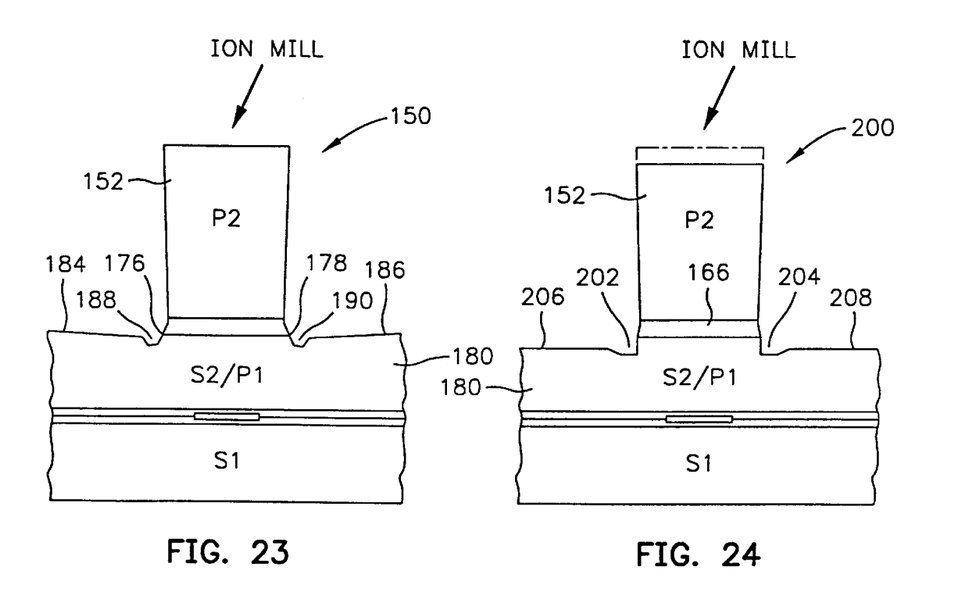
FIG. 23 is an ABS view of the magnetic head after a third step of ion milling notches in the first pole piece adjacent the first and second openings in the protective layer until the protective layer is milled away.
FIG. 24 is an ABS view of the magnetic head wherein an optional fourth step of additional ion milling may be performed to deepen the notches and planarize the first pole piece.

Next, I ion milled the workpiece at an angle of approximately 35° to a normal to the plane 182 until the chromium layers 262, 264 and 266 in FIG. 22 were removed. This resulted in the notches 188 and 190 which were immediately adjacent the first and second corners 176 and 178 at the base of the gap layer 166 and field regions 184 and 186 which slope upwardly from the notches 188 and 190, the upward slope being desirable for preserving a sufficient thickness of the first pole piece above sensitive components therebelow. The write head 150, shown in FIG. 23, is a preferred embodiment of the invention and is identical to the write head shown in FIG. 12 described hereinabove. If desired, a second embodiment 200 of the head can be produced by ion milling at 35° which results in deeper notches 202 and 204 and planarization of the top of the first pole piece at 206 and 208 producing a write head which is identical to that as shown in FIG. 13 described hereinabove.

Figure 25:
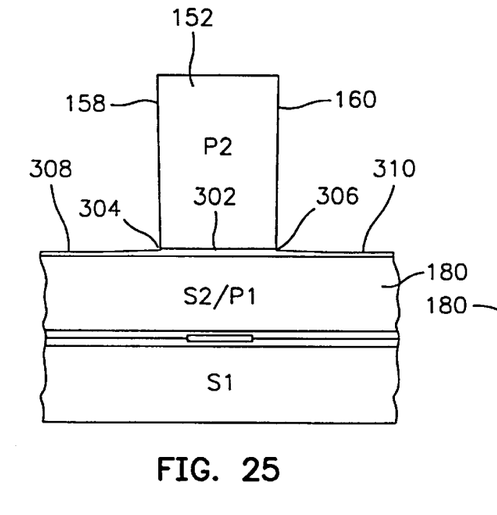
FIG. 25 is an ABS view of a magnetic head prior to commencing a second embodiment of the invention for notching the first pole piece, which figure is identical to FIG. 15, except the write gap layer is thinner than the write gap layer in FIG. 15.
Figure 26:
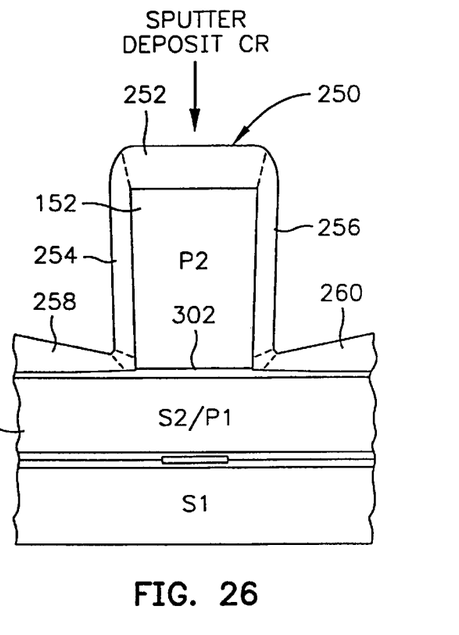
FIG. 26 is an ABS view of the magnetic head showing a first step of sputter deposition of a layer of protective material in a second embodiment of the invention for notching the first pole piece.
Figure 27:
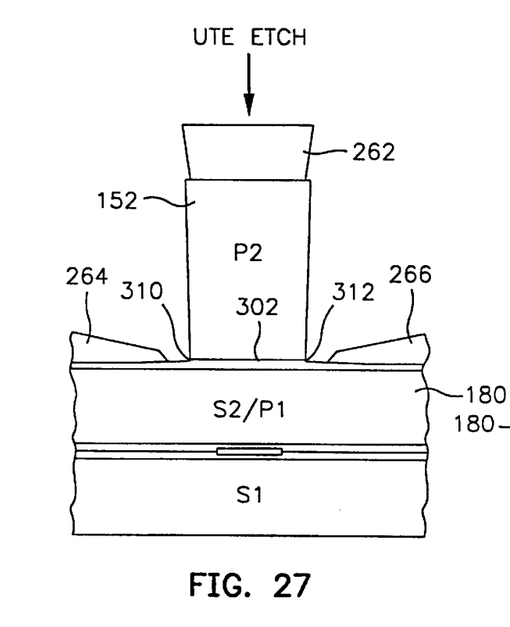
FIG. 27 is an ABS view of the magnetic head showing a second step of removal of portions of the protective layer by etching to expose the write gap layer through first and second openings adjacent where first and second notches are to be formed.
Figure 28:
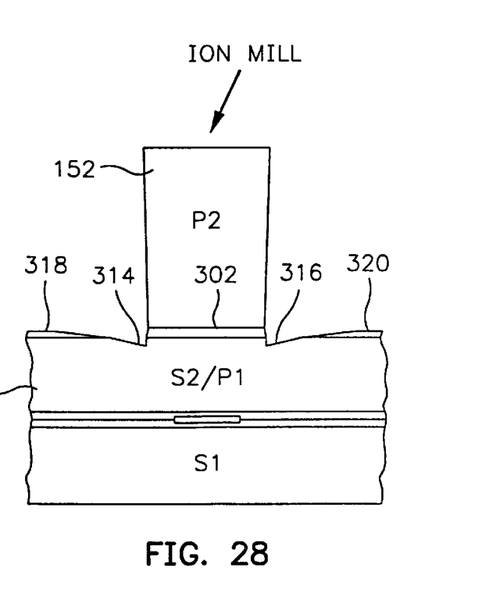
FIG. 28 is an ABS view of the magnetic head after a third step of ion milling notches in the first pole piece adjacent the first and second openings in the protective layer until the protective layer is milled away.
Figure 29:
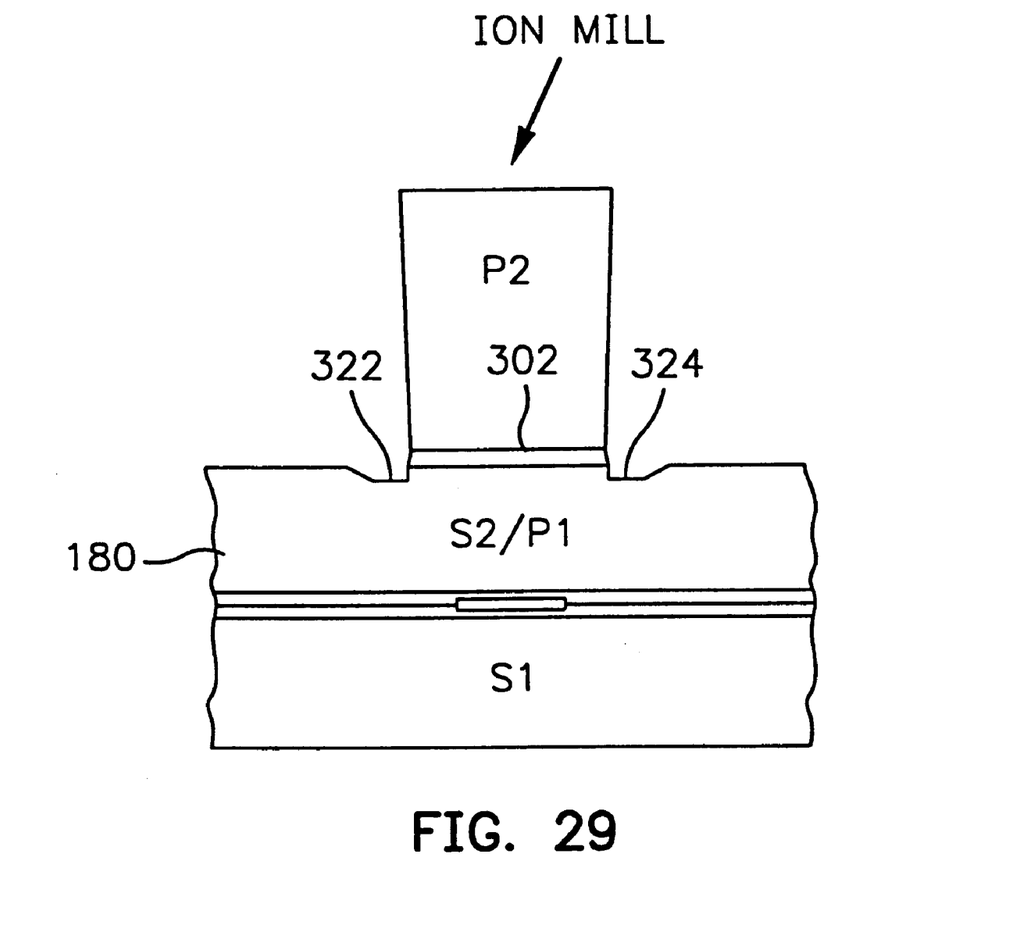
FIG. 29 is an ABS view of the magnetic head where an optional fourth step of additional ion milling may be performed to deepen the notches and planarize the first pole piece.

FIGS. 25–29 show a second embodiment of my invention for notching the first pole piece where the write gap layer is sufficiently thin, in the order of 0.2 μm or less, so that defining the write gap layer as well as notching the first pole piece can be accomplished by ion milling. FIG. 25 is identical to FIG. 15 except a write gap layer 302 is thinner than the write gap layer 166 in FIG. 15, the thickness of the write gap layer 302 of FIG. 25 being on the order of 0.2 μm or less. FIG. 25 illustrates the second pole tip 152 and the write gap layer 302 after removing the P2 seedlayer by ion milling. Because of a typical slight overmilling the write gap layer 302 has slight notches 304 and 306 adjacent the side walls 158 and 160 of the second pole tip 152. FIG. 26 shows a step of sputter depositing the chromium layer 250 to form chromium portions 252, 254 and 256 on the top and side walls of the second pole tip 152, as well as chromium portions 258 and 260 on top of the write gap layer. This step is the same as that shown in FIG. 21 except the chromium layer portions 258 and 260 now are located directly on the write gap layer. FIG. 27 shows the step of etching the chromium layer which quickly removes portions 254 and 256 in FIG. 26 to leave top portions 262, 264 and 266 along with openings 310 and 312, as shown in FIG. 27. The step in FIG. 27 is identical to that shown in FIG. 22 except the openings 310 and 312 in FIG. 27 expose portions of the write gap layer instead of exposing portions of the first pole piece 180. In FIG. 28 ion milling is employed to ion mill the gap layer and notches 314 and 316 in the first pole piece 180. This step is identical to that shown in FIG. 23 except the ion milling mills through the write gap layer thickness shown at the openings 310 and 312 in FIG. 27 prior to notching the first pole piece 180. The side walls of the write gap layer 302 in FIG. 28 are slightly more vertical than the side walls of the write gap layer 166 in FIG. 24, and the notches 314 and 316 are closer to the track width of the second pole tip 152 than that shown in FIG. 24. Accordingly, the process shown in FIGS. 25–28 will reduce the side writing more than the FIG. 24 embodiment. It should be noted, however, that a portion of the layers 262, 264 and 266 will be sacrificed for milling through the write gap layer portions at the openings 310 and 312 in FIG. 27 before notching commences. A portion of the write gap layer 318 and 320 may remain, as shown in FIG. 28, which ensures protection of the first pole piece 180 from overmilling. If desired, ion milling may be continued, as shown in FIG. 29, to remove the gap layer portions 318 and 320 in FIG. 28 to deepen the notches at 322 and 324, as shown in FIG. 29.

It should be understood that the processes described in FIGS. 15–20 and 21–29 are not necessarily restricted to defining a gap of a write head or notches within a first pole tip. The first process can be used for any application where an intermediate layer is to be defined so as to match a base of a layer thereabove and the second process may be employed for notching any thin film layer which is below another thin film layer. Further, a vacuum etching process other than ion beam milling may be employed such as sputter etching or reactive ion etching (RIE). The sputter etching can be employed if the side walls of the second pole tip are vertical or slope outwardly from top to bottom. RIE may be employed if tungsten is employed as a mask instead of chromium.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

I claim:

1. A magnetic write head comprising:
   first and second pole tip layers of first and second pole piece layers respectively and a gap layer, the first pole tip layer having top and bottom surfaces, the bottom surface defining a plane of orientation;
   the gap layer being sandwiched between the first and second pole tip layers;
   the gap layer having a base directly on the top surface of the first pole tip layer and being bounded by said base, a top and first and second side walls and having first and second corners which are located at intersections of the first and second side walls with said base, the second pole tip layer being a pedestal with a base directly on the top of the gap layer and being bounded by its base, a top and first and second side walls;
   the top surface of the first pole tip layer having first and second notches adjacent the first and second corners respectively of the gap layer;
   the top surface of the first pole tip layer having first and second surface portions extending from the first and second notches respectively away from the gap layer; and
   each of the first and second surface portions of the first pole tip layer extending upwardly from each of the first and second notches respectively with a slope that makes a positive angle with respect to said plane of orientation.

2. A magnetic write head as claimed in claim 1 wherein the gap layer is alumina and the first and second pole tip layers are NiFe.

3. A combined magnetic head comprising:
   a write head including:
     first and second pole tip layers of first and second pole piece layers respectively and a gap layer, the first pole tip layer having top and bottom surfaces, the bottom surface defining a plane of orientation;
     the gap layer being sandwiched between the first and second pole tip layers;
     the gap layer having a base directly on the top surface of the first pole tip layer and being bounded by said base, a top and first and second side walls and having first and second corners which are located at intersections of the first and second side walls with said base, the second pole tip layer being a pedestal with a base directly on the top of the gap layer and being bounded by its base, a top and first and second side walls; and
     the top surface of the first pole tip layer having first and second notches adjacent the first and second corners respectively of the gap layer;
     the top surface of the first pole tip layer having first and second surface portions extending from the first and second notches respectively away from the gap layer; and
     each of the first and second surface portions of the first pole tip layer extending upwardly from each of the first and second notches respectively with a slope that makes a positive angle with respect to said plane of orientation;
   a read head including:
     a read sensor, first and second gap layers and first and second shield layers;
     the sensor being sandwiched between the first and second gap layers and the first and second gap layers being sandwiched between the first and second shield layers; and
   the write and read heads being adjacent one another.

4. A magnetic disk drive comprising:
   a write head including:
     first and second pole tip layers of first and second pole piece layers respectively and a gap layer, the first pole tip layer having top and bottom surfaces, the bottom surface defining a plane of orientation;

the gap layer being sandwiched between the first and second pole tip layers;

the gap layer having a base directly on the top surface of the first pole tip layer and being bounded by said base, a top and first and second side walls and having first and second corners which are located at intersections of the first and second side walls with said base, the second pole tip layer being a pedestal with a base directly on the top of the gap layer and being bounded by its base, a top and first and second side walls;

the top surface of the first pole tip layer having first and second notches adjacent the first and second corners respectively of the gap layer;

the top surface of the first pole tip layer having first and second surface portions extending from the first and second notches respectively away from the gap layer; and each of the first and second surface portions of the first pole tip layer extending upwardly from each of the first and second notches respectively with a slope that makes a positive angle with respect to said plane of orientation;

a read head including:
   a read sensor, first and second gap layers and first and second shield layers;
   the sensor being sandwiched between the first and second gap layers and the first and second gap layers being sandwiched between the first and second shield layers; and
   a sensor source for applying a sense current through the sensor; and the write and read heads being adjacent one another to from a combined head;
   a frame;
   a magnetic disk rotatably supported on the frame;
   a support mounted on the frame for supporting the head in a transducing relationship with the magnetic disk;
   rotation power means for rotating the magnetic disk;
   positioning means connected to the support for moving the combined magnetic head to multiple positions with respect to said magnetic disk; and
   processing circuitry means connected to the combined magnetic head, to the means for rotating the magnetic disk and to the positioning means for exchanging signals with the combined magnetic head, for controlling movement of the magnetic disk and for controlling the position of the combined magnetic head.

5. A magnetic write head comprising:

first and second pole tip layers of first and second pole piece layers respectively and a gap layer, the first pole tip layer having top and bottom surfaces, the bottom surface defining a plane of orientation;

the gap layer being sandwiched between the first and second pole tip layers;

the gap layer having a base directly on the top surface of the first pole tip layer and being bounded by said base, a top and first and second side walls and having first and second corners which are located at intersections of the first and second side walls with said base, the second pole tip layer being a pedestal with a base directly on the top of the gap layer and being bounded by its base, a top and first and second side walls;

the top surface of the first pole tip layer having first and second trenches wherein the first and second trenches have first and second commencement locations respectively at the first and second corners respectively of the gap layer and having first and second termination locations respectively spaced from the first and second corners respectively;

the top surface of the first pole tip layer having first and second surface portions extending from the first and second termination locations respectively away from the gap layer;

the first and second surface portions of the first pole tip layer extending in a direction parallel to said plane of orientation or upwardly from the first and second termination locations with a slope that makes a positive angle with respect to said plane of orientation; and each of the first and second trenches being first and second depressions respectively in the top surface of the first pole piece layer that is lower than respective commencement and termination locations and being depressions relative to said first and second surface portions of the top surface of the first pole piece layer.

6. A magnetic write head as claimed in claim 5 wherein the gap layer is alumina and the first and second pole tip layers are NiFe.

7. A combined magnetic head comprising:

a write head including:
   first and second pole tip layers of first and second pole piece layers respectively and a gap layer, the first pole tip layer having top and bottom surfaces, the bottom surface defining a plane of orientation;
   the gap layer being sandwiched between the first and second pole tip layers;
   the gap layer having a base directly on the top surface of the first pole tip layer and being bounded by said base, a top and first and second side walls and having first and second corners which are located at intersections of the first and second side walls with said base, the second pole tip layer being a pedestal with a base directly on the top of the gap layer and being bounded by its base, a top and first and second side walls;
   the top surface of the first pole tip layer having first and second trenches wherein the first and second trenches have first and second commencement locations respectively at the first and second corners respectively of the gap layer and having first and second termination locations respectively spaced from the first and second corners respectively;
   the top surface of the first pole tip layer having first and second surface portions extending from the first and second termination locations respectively away from the gap layer;
   the first and second surface portions of the first pole tip layer extending in a direction parallel to said plane of orientation or upwardly from the first and second termination locations with a slope that makes a positive angle with respect to said plane of orientation;
   each of the first and second trenches being first and second depressions respectively in the top surface of the first pole piece layer that is lower than respective commencement and termination locations and being depressions relative to said first and second surface portions of the top surface of the first pole piece layer;

a read head including:
   a read sensor, first and second gap layers and first and second shield layers;

the sensor being sandwiched between the first and second gap layers and the first and second gap layers being sandwiched between the first and second shield layers; and the write and read heads being adjacent one another.

8. A magnetic disk drive comprising:

a write head including:

first and second pole tip layers of first and second pole piece layers respectively and a gap layer, the first pole tip layer having top and bottom surfaces, the bottom surface defining a plane of orientation;

the gap layer being sandwiched between the first and second pole tip layers;

the gap layer having a base directly on the top surface of the first pole tip layer and being bounded by said base, a top and first and second side walls and having first and second corners which are located at intersections of the first and second side walls with said base, the second pole tip layer being a pedestal with a base directly on the top of the gap layer and being bounded by its base, a top and first and second side walls;

the top surface of the first pole tip layer having first and second trenches wherein the first and second trenches have first and second commencement locations respectively at the first and second corners respectively of the gap layer and having first and second termination locations respectively spaced from the first and second corners respectively;

the top surface of the first pole tip layer having first and second surface portions extending from the first and second termination locations respectively away from the gap layer;

the first and second surface portions of the first pole tip layer extending in a direction parallel to said plane of orientation or upwardly from the first and second termination locations with a slope that makes a positive angle with respect to said plane of orientation;

each of the first and second trenches being first and second depressions respectively in the top surface of the first pole piece layer that is lower than respective commencement and termination locations and being depressions relative to said first and second surface portions of the top surface of the first pole piece layer;

a read head including:

a read sensor, first and second gap layers and first and second shield layers;

the sensor being sandwiched between the first and second gap layers and the first and second gap layers being sandwiched between the first and second shield layers; and a sense current source for applying a sense current through the sensor; and the write and read heads being adjacent one another to form a combined head;

a frame;

a magnetic disk rotatably supported on the frame;

a support mounted on the frame for supporting the head in a transducing relationship with the magnetic disk;

rotation power means for rotating the magnetic disk;

positioning means connected to the support for moving the combined magnetic head to multiple positions with respect to said magnetic disk; and processing circuitry means connected to the combined magnetic head, to the means for rotating the magnetic disk and to the positioning means for exchanging signals with the combined magnetic head, for controlling movement of the magnetic disk and for controlling the position of the combined magnetic head.

* * * * *